(12) United States Patent
Yau

(10) Patent No.: US 7,547,023 B2
(45) Date of Patent: Jun. 16, 2009

(54) METHOD AND APPARATUS FOR CONTROL OF A COLLAPSIBLE GRAVITY POWERED SNOW VEHICLE

(76) Inventor: Chi Lam Yau, 2 Barry St., Dover, NH (US) 03820

(*) Notice: Subject to any disclaimer, the term of this patent is extended or adjusted under 35 U.S.C. 154(b) by 371 days.

(21) Appl. No.: 11/306,132

(22) Filed: Dec. 16, 2005

(65) Prior Publication Data
US 2006/0197294 A1    Sep. 7, 2006

Related U.S. Application Data

(60) Provisional application No. 60/593,215, filed on Dec. 22, 2004.

(51) Int. Cl.
*B62B 9/04* (2006.01)
(52) U.S. Cl. .................................. 280/16; 280/845
(58) Field of Classification Search ................. 280/16, 280/28.14, 21.1, 845, 14, 809, 816, 14.27, 280/14.28
See application file for complete search history.

(56) References Cited

U.S. PATENT DOCUMENTS

| | | | | |
|---|---|---|---|---|
| 307,730 A * | 11/1884 | Proctor | .................. | 280/24 |
| 1,672,782 A * | 6/1928 | Ring | .................. | 280/22 |
| 2,062,953 A * | 12/1936 | Wargo | .................. | 280/28.14 |
| 3,336,037 A * | 8/1967 | Cohen | .................. | 280/28.15 |
| 3,803,653 A * | 4/1974 | Trostad | .................. | 441/72 |
| 3,917,301 A * | 11/1975 | Fabris | .................. | 280/28.14 |
| 4,097,055 A | 6/1978 | Laycraft | .................. | 280/16 |
| 4,349,209 A * | 9/1982 | Chilzer | .................. | 280/16 |
| 4,951,960 A * | 8/1990 | Sadler | .................. | 280/607 |
| 5,566,959 A * | 10/1996 | Tiramani | .................. | 280/28.14 |
| 5,863,051 A | 1/1999 | Brenter | .................. | 280/16 |
| 6,193,244 B1 * | 2/2001 | Vance | .................. | 280/14.22 |
| 6,554,294 B2 * | 4/2003 | Laudon | .................. | 280/7.14 |
| 6,783,134 B2 * | 8/2004 | Geary | .................. | 280/21.1 |
| 6,923,455 B2 * | 8/2005 | Sullivan | .................. | 280/14.27 |
| 6,929,267 B2 * | 8/2005 | Sullivan et al. | .................. | 280/14.28 |
| 6,997,465 B2 * | 2/2006 | Jungnickel | .................. | 280/14.27 |
| 7,204,496 B2 * | 4/2007 | Rawcliffe | .................. | 280/14.21 |
| 7,243,926 B2 * | 7/2007 | Jordan | .................. | 280/21.1 |
| 2002/0153677 A1* | 10/2002 | Laudon | .................. | 280/7.14 |
| 2003/0214105 A1* | 11/2003 | Sullivan et al. | .................. | 280/14.27 |
| 2004/0007837 A1* | 1/2004 | Sullivan | .................. | 280/14.27 |
| 2004/0007838 A1* | 1/2004 | Farmer | .................. | 280/14.27 |

* cited by examiner

*Primary Examiner*—John Q. Nguyen
*Assistant Examiner*—Joseph Rocca
(74) *Attorney, Agent, or Firm*—Philip E. Decker; Mesmer & Deleault, PLLC

(57) ABSTRACT

A gravity powered snow vehicle employing a crank 5 and steering mechanism 4, able to twist a sliding element 21 along its length, and enabling intuitive and direct control over the vehicle to increase performance and agility. Twisting the sliding element 21 generates on its edges varying levels of bite in the snow, allowing the rider to control both speed and direction. The rider in position, holding the handlebar 4, sitting on a seat 14 or standing on foot pegs 15, similar to riding a bicycle, controls the sliding element in a way similar to how snowboarders interact with their sliding element. The vehicle's linkage and architecture allows the sliding element 21 to flex. The vehicle has a collapsible configuration, facilitating transport and access to ascending systems, and their related receptacles, used at ski resorts.

15 Claims, 10 Drawing Sheets

METHOD AND APPARATUS FOR CONTROL OF A COLLAPSIBLE GRAVITY POWERED SNOW VEHICLE

BACKGROUND OF THE INVENTION

1. Field of Invention

The present invention relates to improvements in the method for control, and convenient deployment and transport of gravity powered snow vehicles of the type particularly, but not exclusively, to generic ski/snow bikes and ski/snow scooters.

2. Description of the Related Art

In recent years, generic ski/snow-bikes and scooters, skate-skis, board-skis, and disabled-skier vehicles have gained significant acceptance and access in increasing numbers of North American resorts. General awareness of these vehicles is facilitating access for non-skier/riders and alternative sporting expressions on snow. It is this situation that makes this type of winter sports vehicles attractive.

Generic ski/snow-bikes are generally of similar characteristics to that of conventional bicycles, with comparable riding positions, seated or standing. To execute maneuvers, a forward handlebar steering column is used to turn a ski, snowboard, or dedicated sliding element. Vehicular control comes from making relative angle changes, through the handlebar, between the skis or sliding elements attached to the vehicle fore and aft, and in general foot skis are required to augment steering, stability, and braking. A typical example, FIG. 1, which is the subject of a patent, U.S. Pat. No. 4,097,055, was issued on Jun. 27, 1978 to Kevin W. Laycraft, which is not admitted to being prior art by its mention in this Background section. This is again similar to a conventional bicycle, where making relative angle changes to the wheels changes the direction of the vehicle, but without the gyroscopic forces that help steering and stability.

Although this method of control is general practice on ski/snow bikes, it is however a compromised solution that does not take advantage of the direct and subtle control over the skis/snowboard which skiers and riders enjoy through their bindings. It is through these direct control inputs that make skiers and riders so agile, achieving high performance, capable of tackling challenging terrain and performing very difficult and trick maneuvers.

Basic alpine, downhill 'shaped' skis, skiing technique requires weight transfer, fore and aft along the skis, for skidding turns, and 'edging' the sides of the skis to 'cut' into the snow, for efficient high-angle, non-skidding, 'carved', turns. It is beyond the scope of this document to explain the subtleties of alpine skiing but nevertheless practiced application of the said actions can result in very high levels of control and performance on prepared, natural, and extreme conditions. This is quite obvious to skiing enthusiasts.

Basic snowboarding technique is similar to downhill skiing. By using similar actions of weight transfer along the snowboard for skidding turns, and edging the sides of the snowboard for 'carved' turns, fine control is achieved. One additional control input available to the snowboarder is 'twist' along the length of the snowboard. This action gives a similar result to weight shifting along the snowboard, but does not require weight shifting.

Again, it is beyond the scope of this document to explain the subtleties of snowboarding, but nevertheless practiced application of said actions can result in very high levels of control and performance on prepared, natural, and extreme conditions. It is also particular to snowboarding that some radical maneuvers, tricks, are easier to perform than on two separate skis. This is quite obvious to snowboard enthusiasts.

The SNOWDECK, which is a registered trademark of the Burton Corporation for "skateboards for snow," is shown in FIG. 2. The SNOWDECK is not admitted to being prior art by its mention in this Background section. The SNOWDECK board provides a snow-skateboard design wherein a skateboard-type platform is employed over a small, shaped, duo-direction ski. This design is ridden, without bindings, on the platform in a similar fashion to skateboards, using weight shifting and edging, but NOT twisting, and provides no handle or seat to assist the rider. This device is very challenging to ride and suitable only for well-prepared trails, and not for high performance or uneven terrain.

Ski/snow bikes are in general rather bulky and not easily transportable, or of convenient size or configuration, for ascending systems generally used at resorts. These systems—surface tows, cable tows, chair lifts, gondolas, et cetera—are designed for use by skiers and riders, and investing in adapting them for use with generic ski/snow bikes is unlikely. As a consequence, ski/snow bikes will need to be designed for use with these systems if it is to achieve commercial success and the same freedom skiers and riders enjoy at resorts. An example, in FIG. 3, of a folding ski/snow bike is the subject of a patent; U.S. Pat. No. 5,863,051, issued on Jan. 26, 1999 to Erich Brenter, which is not admitted to being prior art by its mention in this Background section. This vehicle has a good deployed-to-collapsed volume ratio, but is not of a suitable configuration to ride on chairlifts and gondolas or compatible with receptacles associated with them for carrying skis and snowboards. And also, when deployed, it still uses the typical characteristics of ski/snow bikes, FIG. 1, which is a flawed adaptation from the bicycling world.

Currently, no ski/snow bike/scooter manufacturers has been able to develop and market a vehicle that can exploit the advantage of the techniques used in alpine skiing and snowboard riding, especially the technique or method for twisting along the length of the ski, sliding element or snowboard, and provide easy transportability and a compact configuration, for access, for ascending systems, and for their associated receptacles. The present invention takes advantage of skiing and snowboarding techniques, especially that involving twisting along the length of the, sliding element, ski or snowboard, to equip riders with a vehicle that provides direct and intuitive control to attain a high level of agility, performance, and terrain tolerance, as well as of a character and configurations that allow complete access to any resort or terrain.

SUMMARY

The present invention, a gravity powered snow vehicle, employs a new method of control that allows a rider to take advantage of techniques used by skiers and snowboarders, especially by providing the rider with a mechanism to longitudinally twist the sliding element, ski, or snowboard for speed and directional control. The sliding element is assumed to have all the fundamental elements that characterize a ski or snowboard, but could employ specific features that benefit this method of control.

When a ski is sliding transversely down-slope, a trailing edge can be evenly presented at appropriate angles to bite into the snow and control speed. By differentially controlling the edge angle, or applying 'twist', varying amounts of bite is produced along it, and a turn is initiated. Physically the ski will turn down-slope in the direction of the portion of the edge with the least bite on the snow.

A rider, using this vehicle with the twisting mechanism, will experience an intuitive and very direct control over the vehicle's speed and direction without the disjointed feeling associated with separate skis typical on bicycle/scooter-style ski-bike designs. The physical changes made to the ski, twisting longitudinally, weight shifting, and edging, while riding, are very similar to the way snowboarders ride, and consequently, agility, performance, and terrain access is fully exploitable.

Basic elements of the vehicle consists of a steering mechanism that provides a twisting action along the length of the ski, a ski, a handle bar steering assembly with a crank feature, a seat, foot pegs, plates to mount the ski, suspension systems that increase performance and comfort, and a collapsible frame structure that ergonomically positions these parts for riding and allow a reduced configuration for transport and lift access. Also, the vehicle in the collapsed configuration is securely held in such position as to allow easy transport and access to ascending systems, surface tows, cable tows, chair lifts, gondolas, etc., and their associated ski/snowboard receptacles.

DETAILED DESCRIPTION

Figure 1:
FIG. 1 illustrates a typical, prior art, gravity powered snow vehicle.
Figure 2:
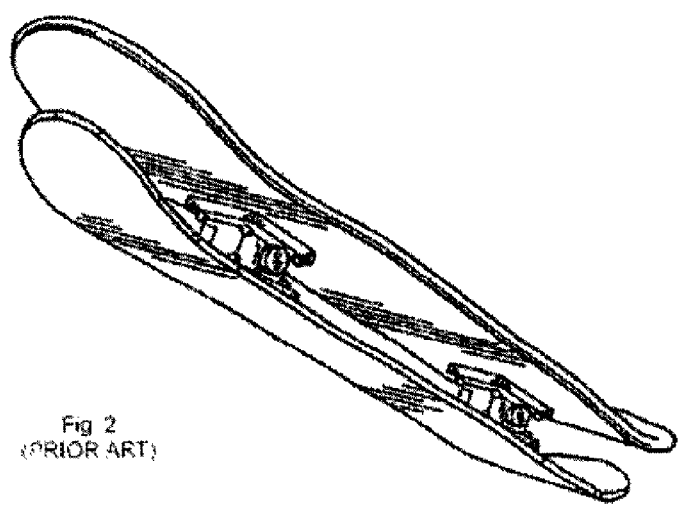
FIG. 2 illustrates a, prior art, gravity powered snow vehicle, the SNOWDECK.
Figure 3:
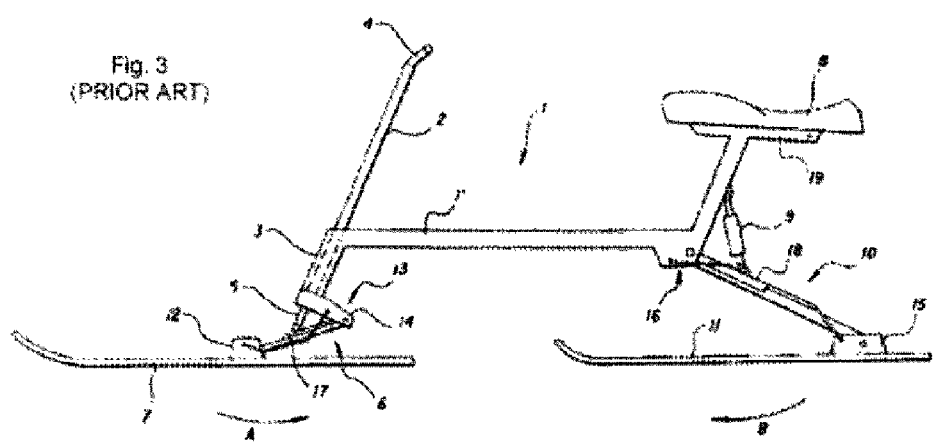
FIG. 3 illustrates a, prior art, gravity powered snow vehicle, which can adopt a reduced configuration.

Reference Numbers
(1) Main Structural member: tubular or profile section
(2) Foremost pivot (steering column support)
(3) Steering column support
(4) Handle bar steering column assembly
(5) Steering crank
(6) Journal yoke
(7) Front ski mounting plate
(8) Compression member
(9) Seat rail
(10) Seat rail pivot
(11) Seat upright support
(12) Rearmost pivot
(13) Upright support joint
(14) Seat
(15) Foot peg
(16) Seat support security latch
(17) Rear ski mounting plate
(18) Swing member
(19) Suspension linkage system
(20) Collapsed position security latch
(21) Sliding element, ski, or snowboard
(22) Steering column crank security latch
(23) Twist angle of crank
(24) Mounting plate shaft

DESCRIPTION—PREFERRED EMBODIMENT

Figure 4:
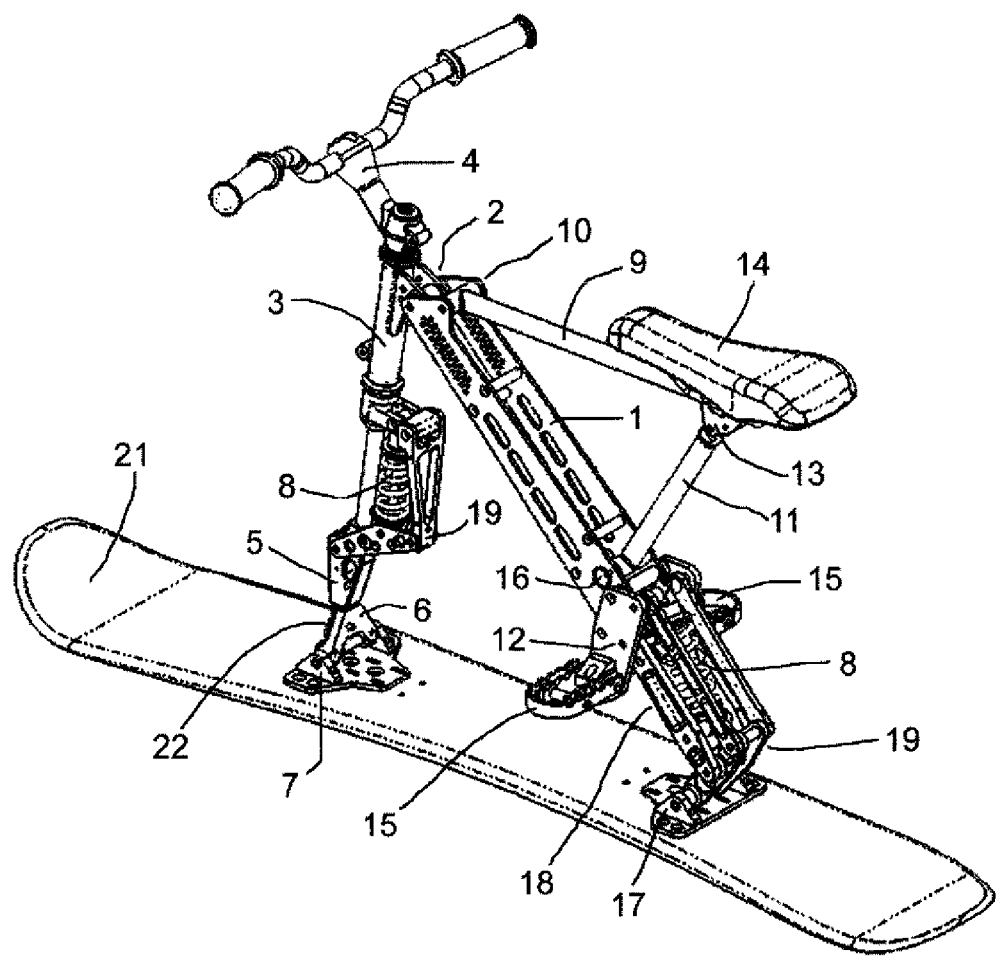
FIG. 4 illustrates, in perspective view, a gravity powered snow vehicle in the preferred embodiment in accordance with the present invention.
Figure 5:
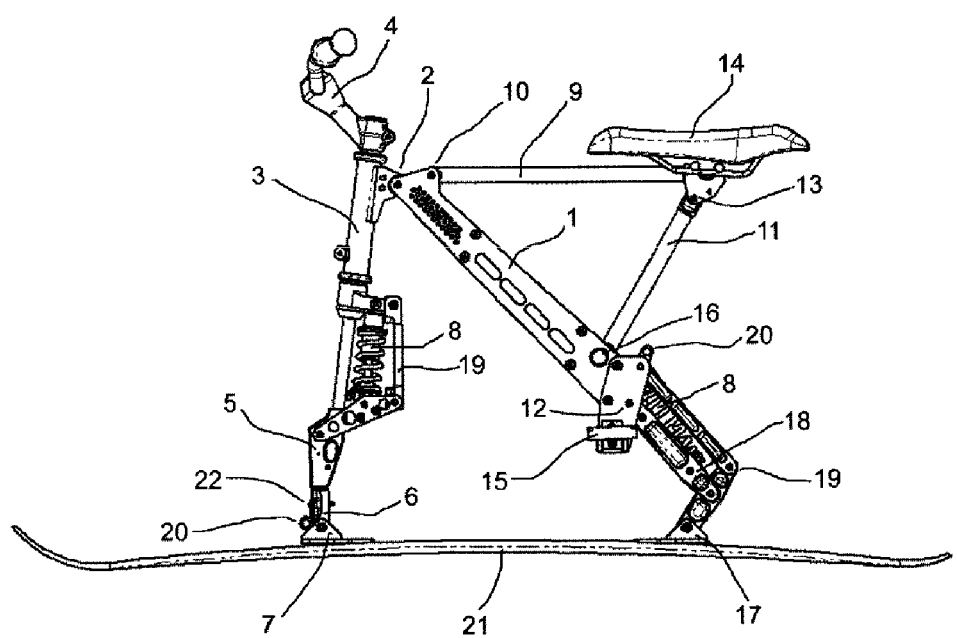
FIG. 5 illustrates, in left side view, a gravity powered snow vehicle in the preferred embodiment in accordance with the present invention.
Figure 6:
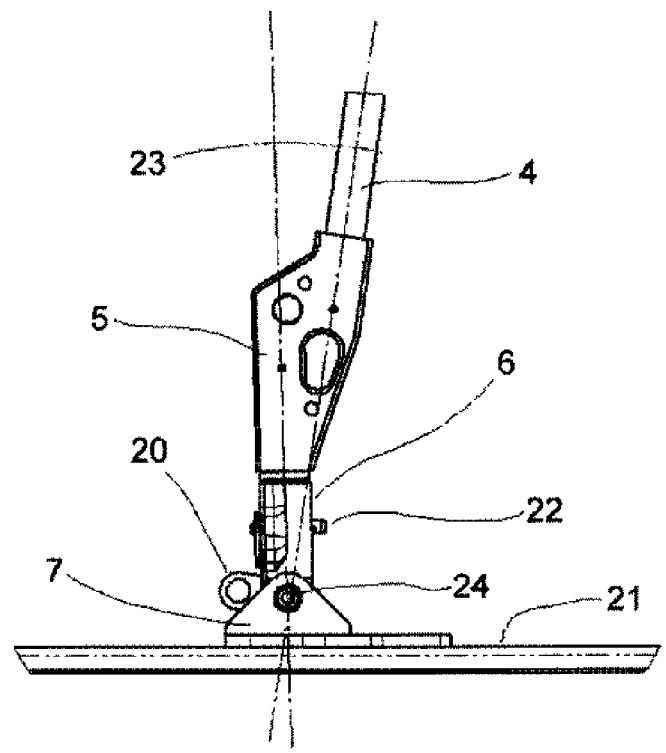
FIG. 6 illustrates, in left side view, the twisting (steering) mechanism of a gravity powered snow vehicle in the embodiments in accordance with the present invention.
Figure 7:
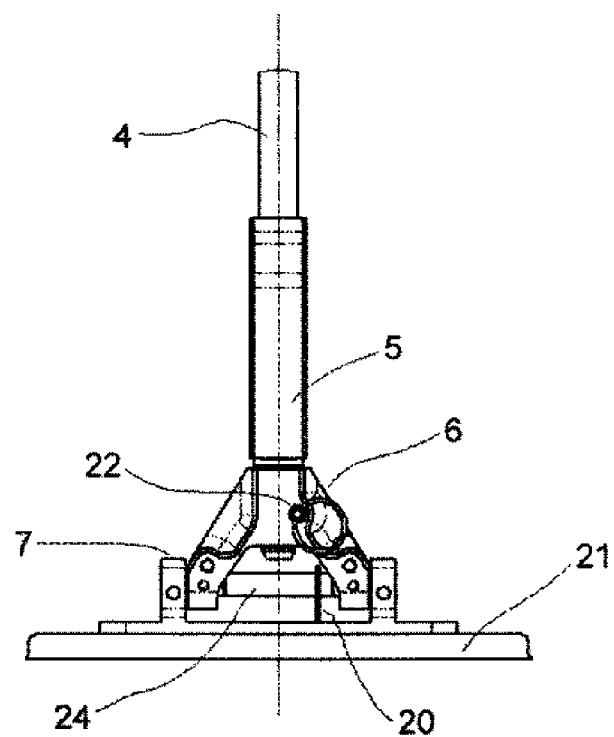
FIG. 7 illustrates, in front view, the twisting (steering) mechanism of a gravity powered snow vehicle in the embodiments in accordance with the present invention.

In the preferred embodiment (see FIG. 4 and FIG. 5) a main structural element 1 of tubular or profile section, made from high performance lightweight metals or advanced composites, having connection features fore and aft, is connected, forward, by a foremost pivot 2 to a steering column support component 3. This pivot 2 allows the vehicle to change configuration and accommodate any flexing of the ski, sliding element, or snowboard 21 while in motion. As used in this application, the term 'sliding element' is intended to include a ski, a snowboard, and any other structures capable of sliding over snow that are known in the art. A handlebar steering column assembly 4 is located by the support component 3 in such a position that allows the assembly 4 to turn a twisting means comprising, in one embodiment, a steering crank 5 at the lower end of the assembly 4 (see FIG. 6). The crank feature 5 is rotatably connected to a journal yoke 6, which is pivotally connected, by a shaft 24, to a ski mounting bracket 7 and fastened to the sliding element 21 (see FIG. 7). Clearly, other alternative levers and linkages can be employed to achieve the same twisting action of the twisting means, which is simply converting a rotational movement, from the handlebar, into a push and pull or rotation motion on a plane, perpendicular to longitudinal axis of the sliding element.

This embodiment also provides a suspension system comprising a compression member 8 and suspension linkage 19 incorporated, without loosing torsional connection, into the steering assembly 4 to provide shock absorption and damping. The compression member 18 is preferably of a known technology type and practiced art, using metal springs, air or an elastomer type material, for shock absorption and damping by fluid, friction or elastomeric hysteresis.

The rearmost connection feature of the structural element 1 is connected by a pivot 12 to a swinging member 18. A suspension system compression member 8 and suspension linkage 19 are pivotally connected to the swing member 18, and the rearmost connection feature of structural element 1 to provide shock absorption and damping. As mentioned earlier, the shock/damping device is of a known technology type and practiced art.

A rear ski mounting bracket or plate 17 fastened to the sliding element 21 is pivotally connected to the lower end of the suspension system 8 and 19 by a shaft 24.

An upright seat support assembly is connected to the main structure 1 by a releasable latch or pin 16. This assembly is a collapsible, multi-member assembly comprising the main structural member 1, seat rail 9, and seat upright support 11. The upright structure allowing compact storage and transport by releasing latch 16. Seat rail 9 is connected by a pivot 10 to the foremost connection feature on the structural member 1. A standard bicycle or custom seat 14 can be incorporated into this member for the rider to sit while riding. The seat 14 is attached to the seat upright support 11 by an upright support joint 13.

A steering column crank security latch 22 (see FIG. 7), built into the yoke 6, is used to securely hold the steering assembly 4, including the crank 5, in the deployed riding configuration.

Figure 10:
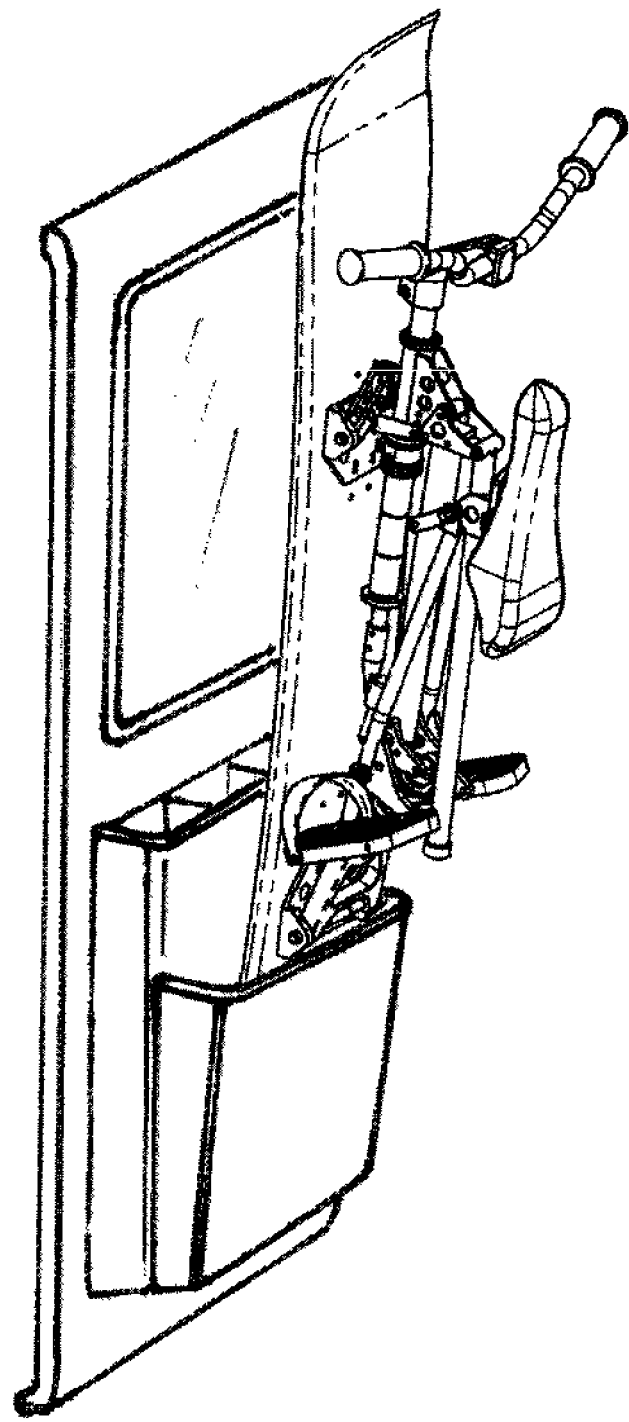
FIG. 10 illustrates a typical skis/snowboard receptacle attached to a gondola door that a gravity powered snow vehicle, in the embodiments in accordance with the present invention, in the reduced configuration, can use on gondolas or lifts so equipped.

In the collapsed configuration, a latch 20 securely engages a feature on the support component 3 to allow transport and access to ascending systems and their related receptacles typically mounted on gondola doors (see FIG. 10).

Operation—Preferred Embodiment

The vehicle is typically operated with both feet up on the foot pegs 15, seated or standing, with hands gripping the handlebar on the steering column 4. Foot skis are not required.

Figure 8:
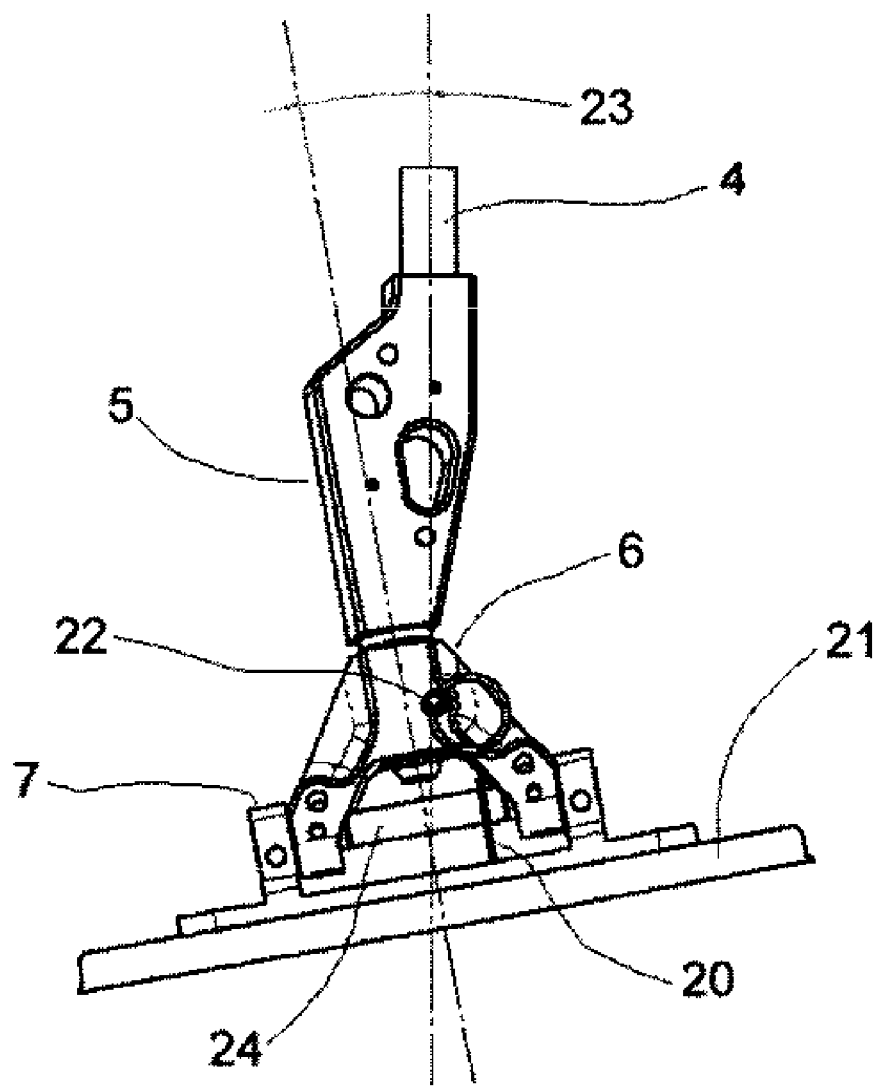
FIG. 8 illustrates, in front view, the twisting (steering) mechanism, in action, of a gravity powered snow vehicle in the embodiments in accordance with the present invention.

By turning the handlebar assembly 4, the crank feature 5 on the lower end of assembly 4, whose crank angle 23 (see FIG. 6) determines the maximum twist applicable to the sliding element 21, will twist the sliding element 21, giving speed and directional control (see FIG. 8). Riding the vehicle requires making physical changes, similar to the snowboarding technique stated earlier, to the sliding element, where twisting, weight shifting, and edging the sliding element is all part of the actions involved while executing maneuvers.

To make a skidding down-slope turn, the handlebar is turned away down-slope, with shoulders opening away from the slope, which twists the forward portion of the sliding element, reducing its bite in the snow, and initiating a turn. Shifting more weight over the handlebar will also initiate turns. Turning up-slope is achieved using the contrary actions described previously.

High performance 'carved or cut' turns are accomplished by appropriately angling the edge of the sliding element, leaning into the turn. The side-cut characteristic of the ski/snowboard or sliding element directly influences the camber, bending center down, of the sliding element, which projects an arced edge, cutting into the snow, and is the theoretical turning radius of the vehicle.

The vehicle is easily configurable for transport and lift access. Referring to FIG. 9a-9f, will illustrate how this is accomplished.

Figure 9A:
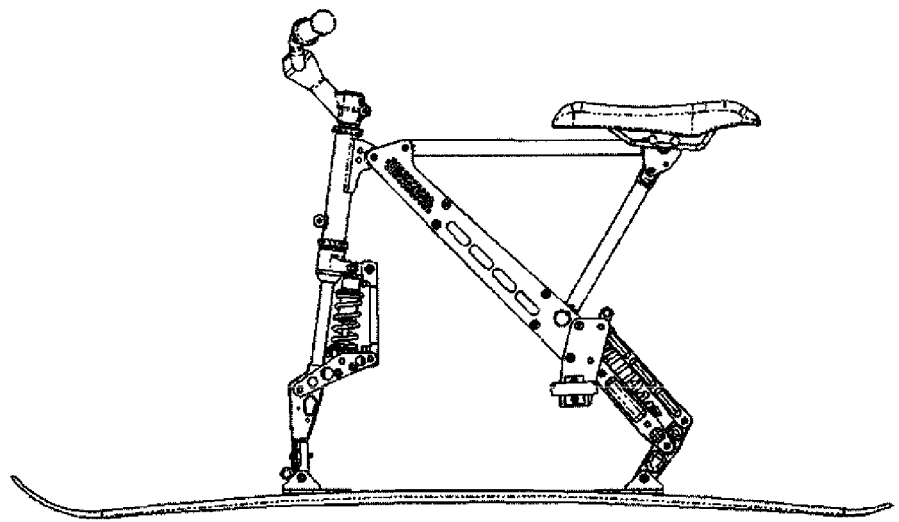
FIG. 9a-9f illustrates the folding sequence, from the deployed for riding, to the reduced for transport and lift access configuration, of a gravity powered snow vehicle in the embodiments in accordance with the present invention.

FIG. 9a, the vehicle is in the deployed ready-to-ride configuration.

Figure 9B:
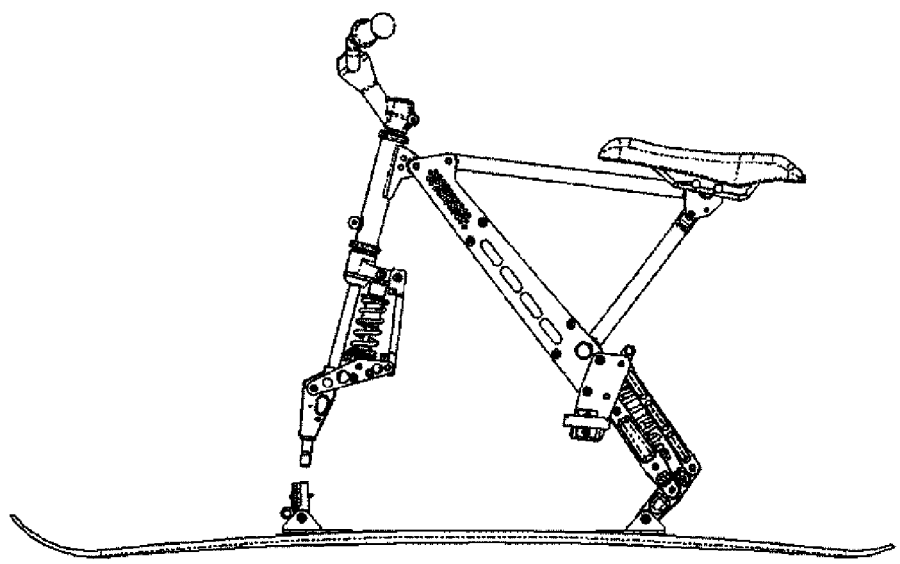

FIG. 9b, steering column crank security latch 22 is unlatched, freeing the handlebar steering column assembly.

Figure 9C:
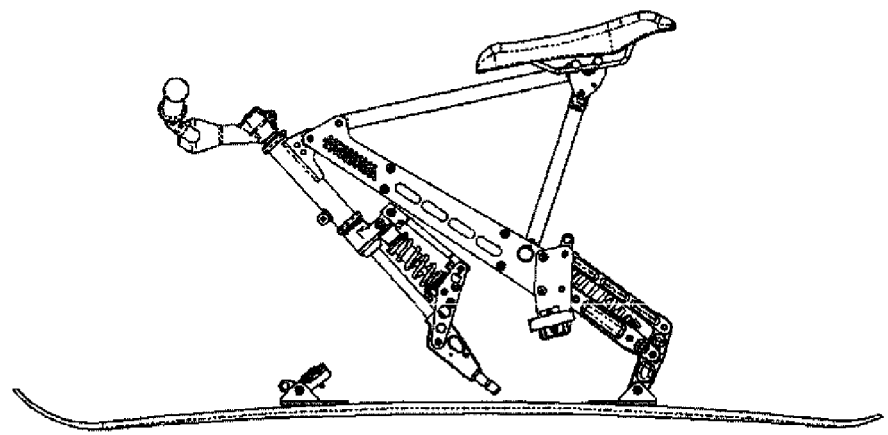

FIG. 9c, the handlebar steering column assembly 4 is folded about the foremost pivot 2 under the main structural member 1.

Figure 9D:
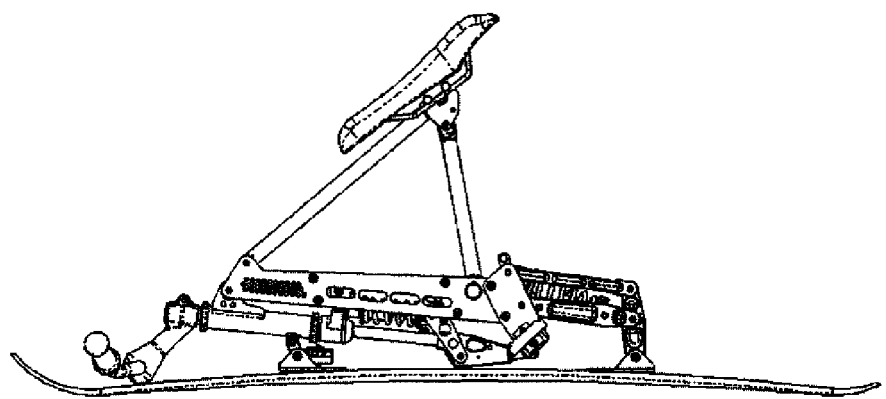

FIG. 9d, the journal yoke 6 is pivoted away for clearance and the collapsed position security latch 20 brought into position to securely latches onto a corresponding feature incorporated into the steering column support component 3.

Figure 9E:
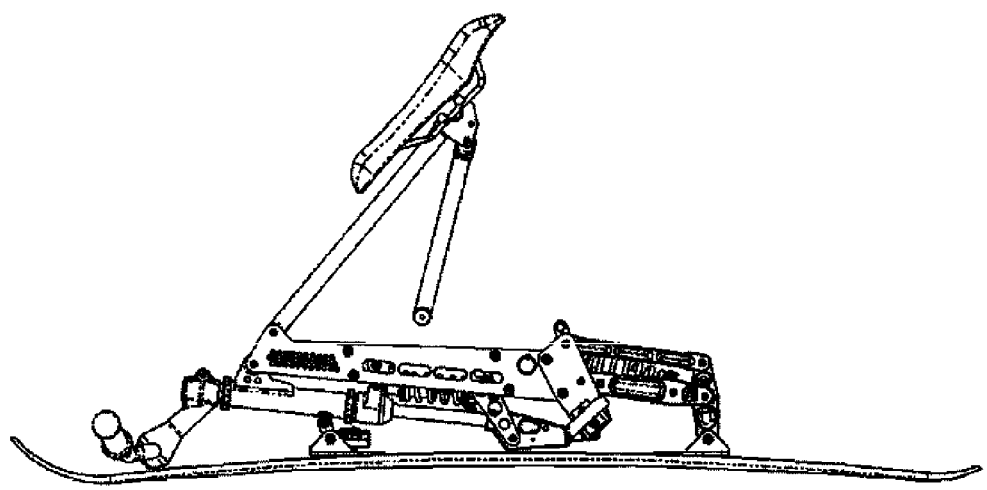

FIG. 9e, seat support security latch 16 is released from the upright support 11 freeing the seat support structure for collapse.

Figure 9F:
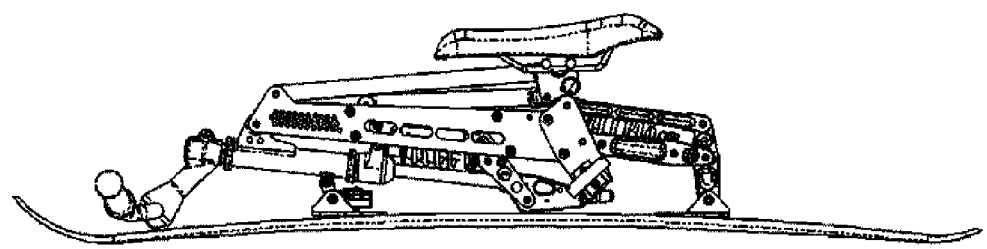

FIG. 9f, security latch 20 is brought into position and securely latches onto a corresponding feature incorporated into the seat rail 9. The vehicle is in the collapsed position ready for transport and lift access. To deploy the vehicle for riding, the process is reversed.

Description—Additional Embodiment (1)

Another embodiment is substantially the same as the preferred, having all the characteristics necessary to ride the vehicle and the ability to change configuration for transport and lift access. The difference is the elimination of the rear suspension system 8 and 19, and replacement of said system with a structural member rigidly mounted to the rearmost connection feature on the main structural member 1. Furthermore, this structural member can be incorporated into the member 1 in the first instance to reduce cost.

Operation—Additional Embodiment (1)

This embodiment is operated in the same manner as the preferred embodiment previously described. Deployment for riding and reduction for transport and lift access can be accomplished independent of any rear suspension device in the same manner as in the preferred embodiment.

Description—Additional Embodiment (2)

A further embodiment is substantially the same as the preferred, having all the characteristics necessary to ride the vehicle and the ability to change configuration for transport and lift access. However, in this embodiment, the front and rear suspension system 8 and 19 is eliminated to save cost. The rear arrangement is substantially the same as described previously in additional embodiment (1). The front suspension system 8 and 19, which is integrated into the handlebar steering column assembly 4, is replaced with a rigid member that integrates into this assembly 4, including the lower steering crank feature 5.

Operation—Additional Embodiment (2)

This embodiment is operated in the same manner as the preferred embodiment previously described. Deployment for riding and reduction for transport and lift access can be accomplished independently of any front and/or rear suspension device in the same manner as in the preferred embodiment.

CONCLUSION, RAMIFICATIONS AND SCOPE

The reader will see that this gravity powered snow vehicle invention, using a ski-twisting mechanism, allows the rider more direct and subtle manipulation of the ski and has control advantages over prior art vehicles using the bicycle or scooter type architecture. In addition the collapsible linkage architecture of this gravity powered snow vehicle invention has a far more compact and favorable configuration for transport and lift access than prior art vehicles to gain convenience and full access to resorts.

The ski-twisting mechanism, the reader will see, is entirely capable of being applied to other styles of vehicles, including scooters (vehicles without a seat), non-configurable (fixed architecture), and handicapped users (with stabilizers). Clearly, also the ski-twisting mechanism can easily be implemented by other, basic mechanical means such as levers and linkages, cables and pulleys, or even transmitted through hydraulic actuators.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A collapsible, gravity-powered snow vehicle comprising:
    a single sliding element capable of sliding on snow;
    a mounting bracket secured to a foremost portion of the sliding element;
    a journal yoke;
    a shaft suitably adapted to engage the mounting bracket and journal yoke in a rotating relationship;
    a steering crank suitably adapted to engage the journal yoke;
    a latch suitably adapted to engage both the journal yoke and steering crank when assembled such that the steering crank and journal yoke may be disassembled when the latch is removed; and
    a main structural member comprising:
        a foremost end pivotally coupled with the steering crank; and
        a rearmost end opposite the foremost end, the rearmost end pivotally coupled with the sliding element, whereby a user on the vehicle operating the steering crank can twist a foremost end of the sliding element to turn and control the vehicle, and then release the steering crank from the journal yoke to collapse the vehicle for transportation.

2. The vehicle of claim 1 further comprising a foot peg coupled with the main structural member.

3. The vehicle of claim 1 further comprising a seat operatively coupled with the main structural member.

4. The vehicle of claim 1 further comprising a steering column support pivotally coupled with the main structural member foremost end and rotationally coupled with the steering crank.

5. The vehicle of claim 1, further comprising handlebars coupled with the steering crank.

6. The vehicle of claim 1 wherein the sliding element is a ski or a snowboard.

7. The vehicle of claim 1 further comprising:
    a seat rail rotatably coupled with the main support member foremost end;
    a seat upright support releasably coupled with the main support member rearmost end and coupled with the seat rail; and
    a seat coupled with the seat rail and seat upright support.

8. The vehicle of claim 7 further comprising an upright support joint coupled with the seat rail, seat upright support, and seat.

9. The vehicle of claim 7 further comprising a releasing latch operatively coupled with the seat upright support and main structural member.

10. The vehicle of claim 1 further comprising a suspension system.

11. The vehicle of claim 10, the suspension system comprising:
    a compression member; and
    a suspension linkage.

12. The vehicle of claim 11, wherein the compression member is one taken from the group consisting of a spring, a shock absorber, and an elastomeric material.

13. The vehicle of claim 1, further comprising:
    a swing member pivotally coupled with the main structural member rearmost end; and
    a suspension system.

14. The vehicle of claim 13, the suspension system comprising:
    a compression member; and
    a suspension linkage operatively coupled with the swing member.

15. The vehicle of claim 14, wherein the compression member is one taken from the group consisting of a spring, a shock absorber, and an elastomeric material.

* * * * *